US012358304B2

(12) United States Patent
Kaneko

(10) Patent No.: US 12,358,304 B2
(45) Date of Patent: Jul. 15, 2025

(54) IMAGE FORMATION DEVICE

(71) Applicant: Konica Minolta, Inc., Tokyo (JP)

(72) Inventor: Tadasuke Kaneko, Koganei (JP)

(73) Assignee: Konica Minolta, Inc., Tokyo (JP)

( * ) Notice: Subject to any disclaimer, the term of this patent is extended or adjusted under 35 U.S.C. 154(b) by 176 days.

(21) Appl. No.: 18/014,441

(22) PCT Filed: Jul. 31, 2020

(86) PCT No.: PCT/JP2020/029439
§ 371 (c)(1),
(2) Date: Jan. 4, 2023

(87) PCT Pub. No.: WO2022/024347
PCT Pub. Date: Feb. 3, 2022

(65) Prior Publication Data
US 2023/0249476 A1 Aug. 10, 2023

(51) Int. Cl.
*B41J 11/00* (2006.01)
*B41J 29/393* (2006.01)

(52) U.S. Cl.
CPC .... *B41J 11/00214* (2021.01); *B41J 11/00212* (2021.01); *B41J 2029/3935* (2013.01)

(58) Field of Classification Search
CPC .................................................. B41J 11/00214
See application file for complete search history.

(56) References Cited

U.S. PATENT DOCUMENTS 9,186,916 B1 11/2015 Ishihara et al.
2005/0219283 A1* 10/2005 Kachi .................... B41J 29/393 347/6
2009/0219342 A1* 9/2009 Hishida .............. B41J 11/00214 347/51
2011/0096132 A1* 4/2011 Kobayashi ......... B41J 11/00214 347/102
(Continued)

FOREIGN PATENT DOCUMENTS

JP 2003-182062 A 7/2003
JP 2006-159684 A 6/2006
(Continued)

OTHER PUBLICATIONS

Japanese Office Action (JPOA) dated Dec. 6, 2023 issued in Japanese patent application No. 2022-539944 and its English machine translation.
(Continued)

*Primary Examiner* — Shelby L Fidler
(74) *Attorney, Agent, or Firm* — RANKIN, HILL & CLARK LLP

(57) ABSTRACT

Provided is an image formation device capable of preventing or suppressing unevenness of a pinning state by setting a fixing condition based on an objective criterion. The image formation device includes: an image forming unit configured to eject ink of one or more colors onto a recording medium to form an image; a fixing unit that includes a pre-fixing unit configured to irradiate the formed image with an energy ray to semi-cure the image, and fixes the image on the recording medium; and a setting unit configured to set an irradiation condition of the fixing unit on the basis of a result of test printing executed in the past, at a time of execution of a print job.

20 Claims, 5 Drawing Sheets

| | A COMPANY PET PAPER | B COMPANY PET PAPER | C COMPANY PP PAPER | D COMPANY COATED PAPER |
|---|---|---|---|---|
| Ye | 80% | 90% | – | – |
| Mg | 60% | 70% | – | 100% |
| Cy | – | 90% | – | – |
| Bk | 80% | 70% | – | 90% |
| Red | 50% | 70% | 100% | – |
| Green | 80% | 80% | – | – |
| Blue | 60% | 60% | – | 100% |

(56) References Cited

U.S. PATENT DOCUMENTS

| | | | | |
|---|---|---|---|---|
| 2012/0300263 | A1* | 11/2012 | Kasai | B41J 11/00214 358/1.18 |
| 2014/0002530 | A1 | 1/2014 | Thompson | |
| 2014/0098157 | A1 | 4/2014 | Aoyama et al. | |
| 2016/0167398 | A1 | 6/2016 | Motosugi et al. | |
| 2017/0313110 | A1* | 11/2017 | Kotik | B41J 11/00214 |
| 2018/0326751 | A1* | 11/2018 | Ando | B41J 11/00212 |

FOREIGN PATENT DOCUMENTS

| | | | |
|---|---|---|---|
| JP | 2009-51095 | A | 3/2009 |
| JP | 2009051095 | A | 3/2009 |
| JP | 2010076322 | A | 4/2010 |
| JP | 2012254612 | A | 12/2012 |
| JP | 2013132791 | A | 7/2013 |
| JP | 2014104623 | A | 6/2014 |
| JP | 2018187854 | A | 11/2018 |
| WO | 2009157262 | A1 | 12/2009 |

OTHER PUBLICATIONS

International Search Report (ISR) dated Oct. 20, 2020 filed in PCT/JP2020/029439.

PCT Written Opinion of the International Seaeching Authority dated Oct. 20, 2020 filed in PCT/JP2020/029439.

Extended European Search Report (EESR) dated Aug. 7, 2023 for European Patent Application No. 20947515.1.

* cited by examiner

FIG. 3A

| | IRRADIATION AMOUNT | |
|---|---|---|
| | STRONG | WEAK |
| INK WET-SPREADING | SMALL | LARGE |

FIG. 3B

| | TIME TO CURING | |
|---|---|---|
| | FAST | SLOW |
| GLOSS | WEAK | STRONG |
| DETAILED REPRODUCIBILITY | RELATIVELY GOOD | RELATIVELY POOR |

FIG. 5

| | A COMPANY PET PAPER | B COMPANY PET PAPER | C COMPANY PP PAPER | D COMPANY COATED PAPER |
|---|---|---|---|---|
| Ye | 80% | 90% | – | – |
| Mg | 60% | 70% | – | 100% |
| Cy | – | 90% | – | – |
| Bk | 80% | 70% | – | 90% |
| Red | 50% | 70% | 100% | – |
| Green | 80% | 80% | – | – |
| Blue | 60% | 60% | – | 100% |

IMAGE FORMATION DEVICE

TECHNICAL FIELD

The present invention relates to an image formation device.

BACKGROUND ART

In recent years, as a device that records a high-definition image on various recording media such as paper and cloth, an image formation device of an inkjet type (hereinafter, referred to as an inkjet image formation device) configured to eject ink from an inkjet head and perform printing on a recording medium has been widely used.

Conventionally, there is known a technique of irradiating, with an energy ray, ink ejected from an inkjet head onto a recording medium to dry the ink (to fix on the recording medium), in an inkjet image formation device. For example, in a case of using UV irradiation ink, the ink ejected on the recording medium can be cured and fixed to the recording medium by irradiating the ink with UV light.

Furthermore, in order to improve image quality, there is known a technique for pinning (semi-curing) ink of each color by irradiating UV light immediately after the ink of each color is ejected (impacts) on a recording medium, in a single-pass inkjet image formation device that performs color printing.

For example, a technique described in Patent Literature 1 describes that an ejection amount of ink and a UV irradiation amount are adjusted for each type of recording medium to adjust a diameter and a thickness of an ink dot.

CITATION LIST

Patent Literature

Patent Literature 1: JP 2003-182062 A

SUMMARY OF INVENTION

Technical Problem

Meanwhile, when the pinning (semi-curing) process described above is performed using the technique described in Patent Literature 1, quality of an image cannot be sufficiently secured, and for example, there is a problem that a streak occurs in a high density portion or smearing occurs in the image.

A cause of such a problem is the fact that it is not considered that physical properties of ink or physical properties of a contact surface to be brought into contact with the ink ejected on the recording medium differ for each color of the ink to be used or for each type of the recording medium to be used.

Specifically, in an image formation device of an inkjet type that performs color printing with ink of multiple colors, light energy absorption characteristics are different for each color (pigment or colorant) of the ink to be used.

Therefore, when color printing is performed by causing the ink of multiple colors to impact onto a same recording medium, there has been a problem that unevenness of a pinning (semi-cured) state occurs for each color (for example, for each ink product) even if pinning conditions (such as a UV irradiation output and an irradiation time with respect to a unit ejection amount of ink) are the same among the colors.

The problem of occurrence of unevenness in the pinning (semi-cured) state similarly occurs in a case where the same ink is ejected to different types of recording media. That is, this is because physical properties of the contact surface to be brought into contact with the ink ejected onto the recording medium are different for each recording medium to be used.

In the conventional technique, there has been no solution for the unevenness of the pinning state for each color, and it has been necessary to perform sample printing and study (trial and error) and set pinning conditions each time a new type of recording medium or ink is handled.

However, the work as described above is complicated and requires time and effort, and productivity of printing is hindered more as a work time becomes longer. In addition, when sample conditions are set based on determination of each worker, there has been a possibility that a difference in image quality may occur for each worker (for example, depending on a skill level).

An object of the present invention is to provide an image formation device capable of preventing or suppressing unevenness of a pinning state for each color by setting a fixing condition based on an objective criterion.

Solution to Problem

An image formation device according to the present invention includes:

- an image forming unit that ejects ink of one or more colors onto a recording medium to form an image;
- a fixing unit that includes a pre-fixing unit that irradiates the formed image with an energy ray to semi-cure the image, the fixing unit fixing the image on the recording medium; and
- a setting unit that sets an irradiation condition of the fixing unit in a print job based on a print result of test printing executed in the past, at a time of execution of the print job.

Advantageous Effects of Invention

According to the present invention, unevenness of a pinning state can be prevented or suppressed by setting a fixing condition based on an objective criterion.

BRIEF DESCRIPTION OF DRAWINGS

FIGS. 3A and 3B are tables illustrating an example of image quality change when a UV irradiation amount and an ink curing time in a pinning process are changed.

FIG. 5 is a table illustrating a specific example of a critical value of a density inputted by a user.

DESCRIPTION OF EMBODIMENTS

Figure 1:
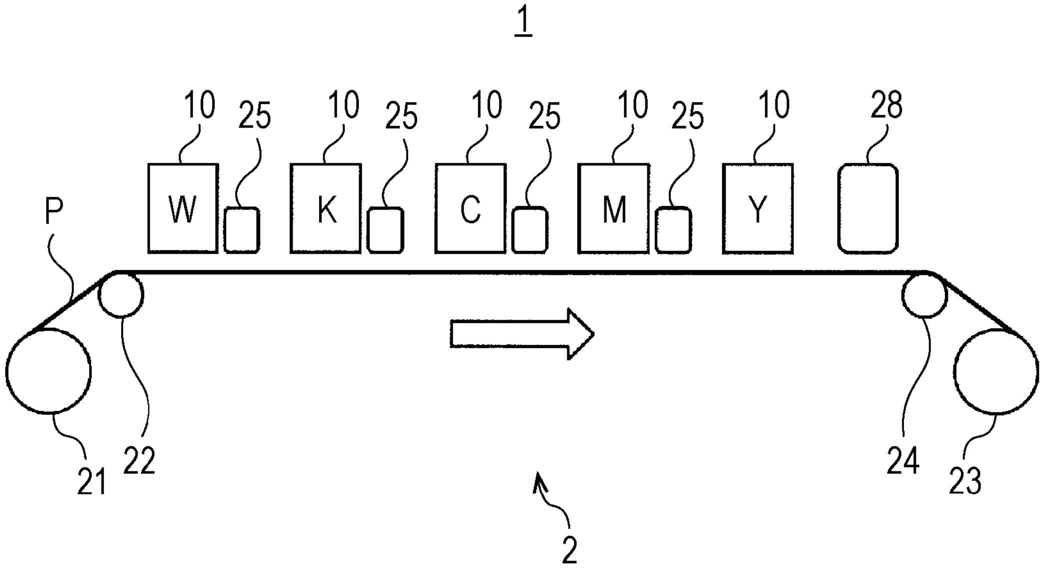
FIG. 1 is a side view illustrating a schematic configuration of an image formation device according to the present embodiment.
Figure 2:
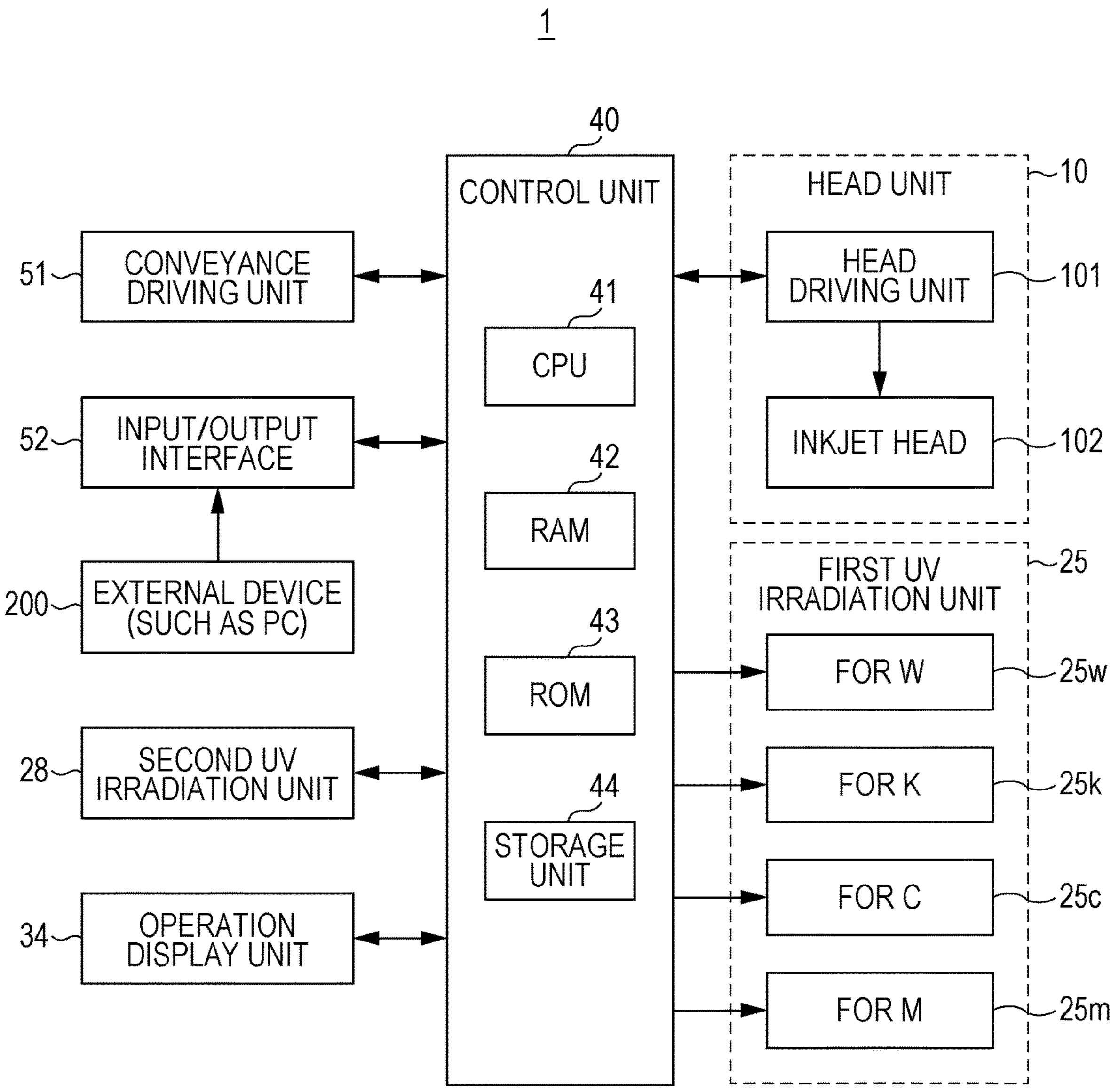
FIG. 2 is a block diagram illustrating a main functional configuration of the image formation device of FIG. 1.

Hereinafter, an inkjet image formation device according to the present embodiment will be described in detail with reference to the drawings. FIG. 1 is a side view illustrating a schematic configuration of an image formation device 1 according to the present embodiment. Furthermore, FIG. 2 is a block diagram illustrating a main functional configuration of the image formation device 1.

As illustrated in FIG. 1, the image formation device 1 includes: a conveyance unit 2 configured to convey a recording medium P along a conveyance direction of a conveyance path; a plurality of head units 10 (for five colors of W, K, C, M, and Y in this example) as image forming units configured to form an ink image (hereinafter referred to as an "image") on the recording medium P by an inkjet method; and a first UV irradiation unit 25 and a second UV irradiation unit 28 to be described later.

The conveyance unit 2 includes: a feeding roller 21 disposed most upstream of the conveyance path; a driven roller 22 disposed downstream of the feeding roller 21 and upstream of the head unit 10; a driven roller 24 disposed downstream of the second UV irradiation unit 28; and a winding roller 23 disposed most downstream of the conveyance path.

The configuration example illustrated in FIG. 1 is a configuration in which a long medium such as cloth or roll paper is used as the recording medium P, and the medium is wound around the feeding roller 21 in advance and is to be wound by the winding roller 23 via the driven rollers 22 and 24 described above.

Rotational driving of the feeding roller 21 and the winding roller 23 is executed by transmission of driving forces of a first driving motor and a second driving motor (not illustrated) of a conveyance driving unit 51 under control of a control unit 40 described later with reference to FIG. 2.

Note that the configuration example of the conveyance unit 2 is not limited thereto, and for example, a pickup roller, a conveyance roller, a conveyance belt, or the like for conveying cut paper one by one may be rotated.

The head unit 10 ejects ink onto the recording medium P conveyed by the conveyance unit 2 from a nozzle opening provided on an ink ejection surface facing the recording medium P, to form an image on the recording medium P.

In a specific example illustrated in FIG. 1, five head units 10 individually corresponding to ink of five colors of white (W), black (K), cyan (C), magenta (M), and yellow (Y) are arranged to be aligned sequentially at predetermined intervals from the upstream side along the conveyance direction of the recording medium P.

Each head unit 10 includes an inkjet head 102 (see FIG. 2). The inkjet head 102 is provided with a plurality of recording elements, each of which includes a pressure chamber that stores ink, a piezoelectric element provided on a wall surface of the pressure chamber, and a nozzle. In this recording element, when a drive signal for deforming the piezoelectric element is inputted, the pressure chamber is deformed by the deformation of the piezoelectric element, pressure in the pressure chamber changes, and ink is ejected from a nozzle communicating with the pressure chamber.

An arrangement range of the nozzles included in the inkjet head 102 in a direction perpendicular to the drawing of FIG. 1 (hereinafter, referred to as an "orthogonal direction") covers a width in the orthogonal direction of a region where the image is formed in the recording medium P conveyed by the conveyance unit 2.

The head unit 10 is used with a position fixed with respect to a rotation shaft of the feeding roller 21 or the winding roller 23 at the time of image formation. That is, the image formation device 1 is a single-pass inkjet image formation device.

In this example, as the ink ejected from the inkjet head 102 to the recording medium P, UV curable ink is used whose viscosity changes according to an amount of energy (in this example, a light amount of an ultraviolet ray (UV) supplied from the first UV irradiation unit 25 and the second UV irradiation unit 28 described later) supplied to the recording medium P.

Furthermore, as the recording medium P, in addition to paper such as plain paper or coated paper, various media on which ink impacting on a surface can be fixed, such as cloth or sheet-shaped resin, can be used.

Next, mainly with reference to FIG. 2, another main functional configuration of the image formation device 1 will be described. The image formation device 1 includes: a head driving unit 101 and the inkjet head 102 included in the head unit 10; the first UV irradiation unit 25 and the second UV irradiation unit 28; an operation display unit 34; the control unit 40; the conveyance driving unit 51; an input/output interface 52; and the like.

The head driving unit 101 causes an amount of ink corresponding to a pixel value of image data to be ejected from the nozzle of the inkjet head 102, by outputting a drive signal for deforming the piezoelectric element in accordance with the image data to the recording element of the inkjet head 102 at an appropriate timing on the basis of the control of the control unit 40.

The control unit 40 includes a central processing unit (CPU) 41, a random access memory (RAM) 42, a read only memory (ROM) 43, and a storage unit 44.

The CPU 41 reads various control programs and setting data stored in the ROM 43 to store in the RAM 42, and executes the programs to perform various types of arithmetic processing. The CPU 41 integrally controls the entire operation of the image formation device 1.

The RAM 42 provides the CPU 41 with a working memory space and stores temporary data. Note that the RAM 42 may include a nonvolatile memory.

The ROM 43 stores various control programs to be executed by the CPU 41, setting data, and the like. Note that, instead of the ROM 43, a rewritable nonvolatile memory such as an electrically erasable programmable read only memory (EEPROM) or a flash memory may be used.

The storage unit 44 stores a print job (an image formation instruction including various types of user setting information such as the number of printed sheets) inputted from an external device 200 via the input/output interface 52, and image data related to the print job. As the storage unit 44, for example, a hard disk drive (HDD) is used, and a dynamic random access memory (DRAM) or the like may be used in combination.

The conveyance driving unit 51 supplies a drive signal to the above-described first driving motor, second driving motor, and the like on the basis of a control signal supplied from the control unit 40, to rotate the feeding roller 21 and the winding roller 23 at a predetermined speed and timing.

The input/output interface 52 mediates transmission and reception of data between the external device 200 and the control unit 40. The input/output interface 52 is configured with, for example, any of various serial interfaces and various parallel interfaces, or a combination thereof.

The external device 200 is, for example, a personal computer (PC), and supplies a print job, image data, and the like to the control unit 40 via the input/output interface 52.

The first UV irradiation unit 25 plays a role of partially curing (semi-curing or pre-curing) (the image) on the recording medium P and pre-fixing on the recording medium P by irradiating, with UV light (ultraviolet ray), the recording medium P on which an image is formed (that is, ink has impacted) by the image forming unit, that is, the inkjet head 102 of the head unit 10 under the control of the control unit 40. This pre-fixing step may be referred to as “pinning”.

Specifically, as illustrated in FIGS. 1 and 2, in the first UV irradiation unit 25, four first UV irradiation units 25*w*, 25*k*, 25*c*, and 25*m* are arranged from the upstream side along the conveyance direction of the recording medium P to the vicinity of the downstream side of each of the head units 10 corresponding to the ink of four colors of white (W), black (K), cyan (C), and magenta (M).

In the present embodiment, the first UV irradiation unit 25 (25*w*, 25*k*, 25*c*, and 25*m*) corresponds to a “pre-fixing unit” of the present invention.

Note that the first UV irradiation unit 25 (25*y*) is not provided in the vicinity of the downstream side of the head unit 10 corresponding to the yellow (Y) ink. The reason for this is that since the yellow (Y) image is the most downstream, it is not necessary to perform the pre-curing process, and it is sufficient to perform a main curing process one time with the second UV irradiation unit 28.

The second UV irradiation unit 28 plays a role of completely curing (main curing) (the image) on the recording medium P to complete fixing to the recording medium P, by irradiating, with UV light (ultraviolet ray), the recording medium P having passed through a position of the head unit 10 that ejects the yellow (Y) ink under the control of the control unit 40.

Thus, in the present embodiment, the first UV irradiation unit 25 (25*w*, 25*k*, 25*c*, and 25*m*) and the second UV irradiation unit 28 correspond to a “fixing unit” of the present invention.

The operation display unit 34 is formed by, for example, a liquid crystal display (LCD) with a touch panel, and functions as a display unit and an operation unit. The display unit displays various operation screens, state display of an image, an operation status of each function, and the like in accordance with a display control signal inputted from the control unit 40. The operation unit includes various operation keys such as a ten key and a start key, receives various input operations by a user, and outputs an operation signal to the control unit 40.

In the present embodiment, the operation display unit 34 and the control unit 40, particularly the control unit 40, have a function as a “setting unit” in the present invention, and details of the setting unit will be described later.

Next, a schematic operation of the image formation device 1 at a time of execution of a print job will be described. When a print job is acquired from the above-described external device (PC) 200 via the input/output interface 52, the image formation device 1 performs the following operation under the control of the control unit 40.

First, the control unit 40 controls the conveyance driving unit 51 of the conveyance unit 2 so as to start a feeding and conveyance operation of the recording medium P, and starts conveyance of the recording medium P.

Subsequently, the control unit 40 performs control to eject ink from the inkjet head 102 of the corresponding color of the head unit 10. By such an operation, an image of a color and a shape defined in the print job is formed on the recording medium P.

Furthermore, the control unit 40 controls the first UV irradiation unit 25 and the second UV irradiation unit 28 to irradiate the recording medium P formed with the image with UV light for pinning and main curing, and executes the steps of pinning (pre-fixing) and main curing of the image on the recording medium P.

After completion of the pinning and main curing process, the recording medium P is wound around the winding roller 23 via the driven roller 24. Then, when the image formation specified in the print job is executed, the series of processes described above ends.

Meanwhile, in the inkjet image formation device 1 that performs color printing using the ink of multiple colors as described above, for example, there has been a case where image quality deterioration such as a streak occurs in a high density portion or smearing may occur in an image due to different absorption characteristics of light energy for each color (colorant) of the ink to be used.

Specifically, in the image formation device 1 that performs color printing with the ink of multiple colors, light energy absorption characteristics are different for each color (colorant) of the ink to be used. In addition, in an actual ink product, various containing substances (so-called impurities) are contained in addition to the colorant, for example, a drying inhibitor for preventing clogging of the nozzle, and the like.

Therefore, when color printing is performed by causing the ink of multiple colors to impact onto a same recording medium P, there has been a problem that unevenness in a pinning (semi-cured) state occurs for each color (for example, for each ink product) even if pinning conditions (a UV irradiation output and an irradiation time with respect to a unit ejection amount of ink, and the like) in the first UV irradiation unit 25 (25*w* to 25*m*) are made the same for each color.

The problem of occurrence of unevenness in the pinning (semi-cured) state similarly occurs in a case where the same ink is ejected to different types of recording media P. That is, this is because physical properties of a contact surface to be brought into contact with the ink ejected onto the recording medium P are different for each recording medium P to be used.

In the conventional technique, there has been no solution for the unevenness of the pinning state for each color, and it has been necessary to perform sample printing and study (trial and error) and set pinning conditions each time a new type of recording medium or ink is handled.

FIGS. 3A and 3B are tables illustrating an outline of a setting example of pinning conditions related to ink characteristics. Here, FIG. 3A is a table illustrating a general setting example of pinning conditions (intensity of the UV irradiation light amount) in a case of adjusting a wet-spreading manner of ink.

As illustrated in the table of FIG. 3A, in general, the wet-spreading of ink in the pinning step becomes smaller as an irradiation light amount of UV to be outputted from the first UV irradiation unit 25 (25*w* to 25*m*) is made stronger (larger), and conversely, the wet-spreading of the ink in the pinning step becomes larger as the amount of UV irradiation light to be outputted is made weaker (smaller).

Whereas, FIG. 3B is a table illustrating a general setting example of pinning conditions (time to pre-curing) in a case of adjusting glossiness of ink and detailed reproducibility of ink.

As illustrated in the table of FIG. 3B, in general, when it is desired to weaken the glossiness of the ink, the irradiation light amount of UV to be outputted from the first UV irradiation unit 25 (25*w* to 25*m*) is made stronger (larger) so that the curing time of the ink becomes faster. In this case, the detailed reproducibility of the ink is also relatively good.

Whereas, when it is desired to strengthen the glossiness of the ink, the irradiation light amount of UV to be outputted from the first UV irradiation unit 25 (25*w* to 25*m*) is made weaker (smaller) so that the curing time of the ink is slower. Whereas, in the case of such setting, the detailed reproducibility of the ink becomes relatively poor as compared with the case where the curing time of the ink is faster.

In general, in the related art, a user (a worker) of the image formation device 1 has been performing work of examining the pinning condition of the first UV irradiation unit 25 (25*w* to 25*m*) each time a new type of recording medium P or ink is handled, repeatedly performing sample printing and setting change by trial and error in order to obtain an image of intended quality, and determining final setting contents to be used in actual printing.

However, the work as described above is complicated and requires time and effort, and productivity of printing is hindered more as a work time becomes longer. In addition, when the pinning condition in the actual printing is set based on determination of each worker, there has been a possibility that a difference in image quality may occur for each worker (for example, depending on a skill level).

As a result of intensive studies to solve the above-described problems, the present inventors have decided to provide the following configuration or function in the image formation device 1.

That is, the image formation device 1 according to the present embodiment has a configuration of including a setting unit configured to set (select or change) irradiation conditions (an output, a time, and the like) in the fixing unit (the first UV irradiation unit 25 (25*w* to 25*m*) and the second UV irradiation unit 28) on the basis of a print result of test printing executed in the past, at a time of execution of the print job.

In one specific example, the operation display unit 34 and the control unit 40 in FIG. 2 function as the "setting unit" described above.

Specifically, the control unit 40 executes a process of executing the "test printing" described above. Furthermore, the control unit 40 performs a process of reflecting a print result of the executed test printing mainly in the irradiation conditions (an output, a time, and the like) of the pinning in the first UV irradiation unit 25 (25*w* to 25*m*).

In one specific example, as the irradiation condition of the fixing unit, the control unit 40 sets an irradiation energy amount of the UV light irradiated by the first UV irradiation unit 25 (25*w* to 25*m*) at a time of execution of the print job.

Note that the irradiation conditions of the fixing unit to be set include the presence or absence of UV light irradiation and the setting of the irradiation energy amount in each of the first UV irradiation units 25*w*, 25*k*, 25*c*, and 25*m*. For example, when printing an image for which white (W) ink is not ejected at a time of execution of a print job (at the time of actual printing), the control unit 40 performs setting not to emit UV light from the first UV irradiation unit 25*w* (setting the irradiation energy to 0).

Thus, the control unit 40 sets the irradiation energy amount of the UV light irradiated by the corresponding first UV irradiation unit 25 (25*w* to 25*m*) for each of the ink ejected from the head unit (image forming unit) 10.

Whereas, the operation display unit 34 plays a role of displaying a setting screen or an input screen for allowing the user to perform various settings (selection or change) at the time of execution of test printing or at the time of execution of a print job (that is, actual printing), to achieve convenience of the user.

Furthermore, the operation display unit 34 also displays a database (data contents to be accumulated or updated) relating to pinning irradiation conditions in the first UV irradiation unit 25 (25*w* to 25*m*). Such a database can be stored in the storage unit 44 in FIG. 2, for example. Furthermore, data of an image (an inspection chart) printed at a time of test printing can also be stored in the storage unit 44.

Figure 4:
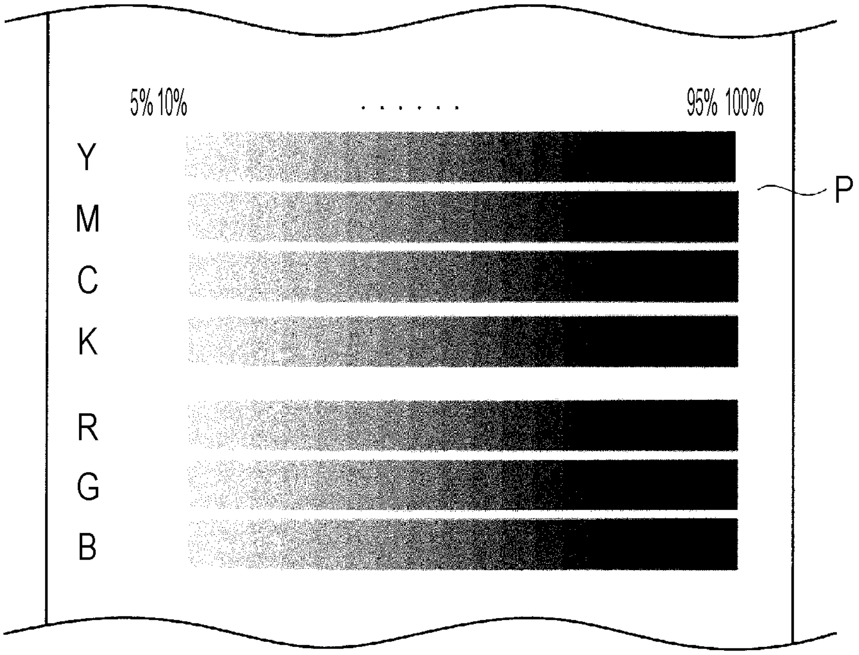
FIG. 4 is a view illustrating a specific example of a gradation chart printed at a time of test printing.

FIG. 4 illustrates a specific example of a test image (a gradation chart) printed at the time of test printing in the present embodiment.

The gradation chart illustrated in FIG. 4 shows an example obtained by driving the head unit 10 that ejects ink of Y, M, C, and K colors under the control of the control unit 40, to continuously form a solid image of each color of Y, M, C, and K and an image of each color of R, G, and B to be a complementary color (a mixed color) each at a density of 5% intervals until the density reaches 100%.

Such a gradation chart is a chart obtained by gradually changing a density of an image formed with a single color or a mixed color of ink ejected from the image forming unit (the inkjet head 102 of the head unit 10), and corresponds to an "inspection chart" of the present invention.

As described above, by printing a predetermined inspection chart (the gradation chart) at the time of test printing, it is possible to quantitatively determine determination regarding image defects, deterioration of image quality, and the like, and work efficiency can be improved.

Note that, in the example illustrated in FIG. 4, it is assumed that the color of the recording medium P used in the actual printing is white (W), and thus the head unit 10 to eject the white (W) ink is not operated. As another example, in a case where the color of the recording medium P used in the actual printing is a color other than white (W), the control unit 40 can print the inspection chart (the gradation chart) by operating all the head units 10 that eject the ink of five color.

At the time of outputting the gradation chart described above, the control unit 40 sets the irradiation condition of pinning in the first UV irradiation unit 25 (25*w* to 25*m*) to a predetermined standard value (for example, 50% output).

Next, the worker visually recognizes a test image (in this example, the gradation chart of seven colors of Y, M, C, K, R, G, and B) printed on the recording medium P, checks image deterioration such as smearing or streaks, or a state of image quality such as intensity of gloss, and inputs a confirmation result through the input screen displayed on the operation display unit 34. The inputted result is stored in the above-described storage unit 44 of the image formation device 1 and accumulated as a database.

FIG. 5 illustrates an example of a database in which the confirmation result inputted by the worker through the input screen is stored (accumulated) in the storage unit 44 of the image formation device 1.

Note that, the illustrated example shows a result in a case where the gradation chart of the seven colors described above formed using ink of Y, M, C, and K colors of the same manufacturer is printed on four different recording media P, that is, PET paper manufactured by A company, PET paper manufactured by B company, PP paper manufactured by C company, and coated paper manufactured by D.

In one specific example, the control unit 40 causes the operation display unit 34 to display an input screen to allow the worker to input a density at which a streak of the image is generated regarding each color of the seven colors described above, a type of the recording medium P used (distinction of a paper type, cloth, or the like), a manufacturer, a product name, and the like, after the gradation chart described above with reference to FIG. 4 is printed.

In the example illustrated in FIG. 5, it can be seen that, in a case where the PET paper manufactured by A company is used as the recording medium P, a streak has occurred in an image having a density of 80% in each of Y (Ye) color, K (Bk) color, and G (Green) color, a streak has occurred in an image having a density of 60% in each of M (Mg) color and B (Blue) color, a streak has occurred in an image with a density of 50% in R (Red) color, and no streak has occurred in an image with any density (5 to 100%) in Cy (C) color.

In addition, in the example illustrated in FIG. 5, it can be seen that, in a case where the PET paper manufactured by B company is used as the recording medium P, a streak has occurred in an image with a density of 90% in each of Y (Ye) color and C (Cy) color, a streak has occurred in an image with a density of 80% in the G (Green) color, a streak has occurred in an image with a density of 70% in M (Mg) color, K (Bk) color, and R (Red) color, and a streak has occurred in an image with a density of 60% in B (Blue).

Furthermore, in the example illustrated in FIG. 5, it can be seen that, in a case where the PP paper manufactured by C company is used as the recording medium P, a streak has occurred in an image with a density of 100% in the R (Red) color, but no streak has occurred in any of other six colors in an image with any density (5 to 100%).

Furthermore, in the example illustrated in FIG. 5, it can be seen that, in a case where the coated paper manufactured by D company is used as the recording medium P, a streak has occurred in an image with a density of 100% in each of the M (Mg) color and the B (Blue) color, a streak has occurred in an image with a density of 90% in the K (Bk) color, and no streak has occurred in other four colors in an image with any density (5 to 100%).

Thereafter, at a time of setting operation of a print job, that is, actual printing, the control unit 40 performs a process of displaying a message prompting the user (the worker) to select desired image quality (gloss, sharpness, and the like of an image) in the actual printing together with a type and a manufacturer of the recording medium P to be used, through the setting screen displayed on the operation display unit 34.

Then, the control unit 40 calculates an optimal value (an output or the like) regarding the irradiation condition of pinning in the first UV irradiation unit 25 (25*w* to 25*m*) so as to realize image quality (designated image characteristics) selected by the user (the worker) through the operation display unit 34, and sets such an optimal value.

For example, in a case where the recording medium P to be used is the PET paper of A company described in FIG. 5, and in a case where image quality designated by the user places importance on detailed reproducibility (sharpness), the control unit 40 sets outputs of the first UV irradiation unit 25 and the second UV irradiation unit 28 to be high (for example, 1.1 times of the normal time) so that the ink cures faster. At this time, the control unit 40 sets the output of the first UV irradiation unit 25*m* (see FIG. 2 as appropriate) for magenta (M) color in which an image defect has occurred at a relatively low density to be higher (for example, 1.4 times of the normal time).

By performing the setting as described above, the semi-cured (pre-fixed) state of the ink ejected onto the specific recording medium P can be uniformized.

Subsequently, the control unit 40 controls each unit as follows at the time of executing a print job, that is, actual printing.

First, similarly to the above, the control unit 40 controls the conveyance driving unit 51 of the conveyance unit 2 so as to start a feeding and conveyance operation of the recording medium P, and starts conveyance of the recording medium P.

Subsequently, the control unit 40 performs control to eject ink from the inkjet head 102 of the corresponding color of the head unit 10. By such an operation, an image of a color and a shape defined in the print job is formed on the recording medium P.

Furthermore, the control unit 40 controls the first UV irradiation unit 25 and the second UV irradiation unit 28 to irradiate the recording medium P formed with the image with UV light for pinning and main curing, and executes the steps of pinning (pre-fixing) and main curing of the image on the recording medium P.

At this time, the control unit 40 controls the first UV irradiation unit 25 so as to perform UV irradiation by each of the first UV irradiation units 25*k*, 25*c*, and 25*m* (and 25*w* as necessary) under conditions (the output, the UV light amount, and the like) according to the set optimal value.

Furthermore, the control unit 40 may control the conveyance driving unit 51 to change a conveyance speed of the recording medium P by the conveyance unit 2 (in this example, the winding roller 23 and the like) as necessary. For example, when the conveyance speed of the recording medium P is lowered, an amount of UV light emitted from the first UV irradiation unit 25 can be increased as compared with a case of a normal conveyance speed.

After completion of the pinning and main curing process, the recording medium P is wound around the winding roller 23 via the driven roller 24. Then, when the image formation specified in the print job is executed, the series of processes described above ends.

Note that, in addition to the example illustrated in FIG. 5, results can be inputted from various viewpoints and stored in a database, such as, for example, a result of printing a test image (a gradation chart of a plurality of colors) obtained by combining ink of different manufacturers for each color on the recording medium P of the same paper type of the same manufacturer.

In this case, at a time of setting operation of a print job, that is, actual printing, the control unit 40 performs processing similar to that described above after performing a process of prompting the user (the worker) to select a manufacturer and a product name of ink to be used, a type and a manufacturer of the recording medium P to be used, and the like through the setting screen displayed on the operation display unit 34.

Thus, according to the present embodiment, by inputting once a print result of an outputted test image (the gradation chart of a plurality of colors), it is possible to reproduce desired image characteristics without performing complicated pinning condition setting work as in the related art, when performing the actual printing again by using the same ink and the recording medium P.

Further, according to the image formation device 1 of the present embodiment, since the fixing condition is set on the basis of an objective criterion and a result, such as a density at which an image defect occurs when a predetermined common inspection chart (gradation chart) is printed by using a specific ink and the recording medium P, it is possible to effectively prevent pinning condition setting contents from being different for each worker.

Further, according to the present embodiment, at a time of execution of the print job, irradiation conditions of the first UV irradiation unit 25 (25*w* to 25*m* in this example) are calculated and set for each color so as to satisfy the designated image characteristics (image quality such as gloss and sharpness) on the basis of a print result (the gradation chart of a plurality of colors) of an image for test printing executed in the past, so that unevenness of the pinning state for each color can be prevented or suppressed. In addition, according to the present embodiment, at a time of execution of a print job, it is possible to finely respond to a demand (focusing on gloss, focusing on sharpness, and the like) of image quality from a customer in a small number of steps.

Note that the configuration example described above is a configuration in which the worker evaluates printed matter of the outputted test image (the gradation chart of a plurality of colors), and a color and a density of the image in which image deterioration (a streak in this example) has occurred are manually inputted by the worker.

As another configuration example, a configuration may be adopted in which, for example, an image reading unit (such as a CCD scanner) (not illustrated) is disposed on the conveyance path on the downstream side of the second UV irradiation unit 28 and on the upstream side of the winding roller 23, the control unit 40 evaluates (determines) the presence or absence of occurrence of a streak on the image for each density constituting the gradation chart of each color described above on the basis of a reading result by the image reading unit, and the evaluation result is automatically inputted.

Furthermore, in the configuration example described above, the configuration has been described in which the worker inputs evaluation of printed matter of an outputted test image (the gradation chart of a plurality of colors) through the input screen displayed on the operation display unit 34.

As another configuration example, a configuration may be adopted in which the input screen and the setting screen described above are displayed on the external device 200 (the PC in the example of FIG. 2) connected to the image formation device 1, and the worker inputs evaluation of printed matter of an outputted test image (the gradation chart of a plurality of colors) through the input screen displayed on the external terminal.

In the configuration example described above, it has been assumed that the output and evaluation of the printed matter of the test image (the gradation chart of a plurality of colors) are performed when ink to be used in the image formation device 1 is changed, or when a type of the recording medium P to be used is changed.

Whereas, the timing of outputting and executing the evaluation of the test image (the gradation chart of a plurality of colors) is not limited to the above, and the output and the evaluation may be executed at any timing on the basis of a user's instruction, for example.

For example, when deterioration of the components of the head unit 10 described above, particularly the inkjet head 102, progresses due to durability, image deterioration such as a streak is likely to occur. Therefore, it is desirable to perform a process of outputting and evaluating the test image (the gradation chart of a plurality of colors) according to a user's instruction (an input operation).

As described above, by performing the process of outputting and evaluating the test image (the gradation chart of a plurality of colors) at any timing, the control unit 40 can calculate a more optimal value (an output or the like) according to the current durability of the device regarding the irradiation condition of pinning in the first UV irradiation unit 25 (25*w* to 25*m*), and can set such an optimal value.

Note that a new value of the irradiation condition of pinning calculated in this manner can be updated by overwriting the existing setting contents. Alternatively, the new value of the irradiation condition of pinning may be registered (stored in the storage unit 44) under a name different from the existing setting contents. In this case, the existing setting contents (for example, setting values in a state where the components of the head unit 10 are new) can be saved.

As another example, dot spread during pinning may also be affected when a temperature environment changes. For example, the temperature environment may change at various times such as when the image formation device 1 is moved to another place in the factory, when the season changes, or when a situation of an air conditioner at an installation place changes.

Whereas, by configuring to be able to execute the process of outputting and evaluating the test image (the gradation chart of a plurality of colors) at any time as described above, the control unit 40 can calculate a more optimal value (an output or the like) according to the current temperature environment of the device regarding the irradiation condition of pinning in the first UV irradiation unit 25 (25*w* to 25*m*), and can set such an optimal value.

Furthermore, as an additional configuration, it is possible to adopt a configuration including a print management unit that performs a process of prompting printing of the above-described test image (the gradation chart of a plurality of colors) and inputting of a print result when an image forming condition or an environment around the image formation device 1 changes.

In one specific example, the control unit 40 of the image formation device 1 is provided with the function as the print management unit described above. In this case, the control unit 40 monitors, for example, detection values of a temperature and humidity sensor (not illustrated) in the image formation device 1, and stores values of ambient temperature and humidity corresponding to the detection values of the temperature and humidity sensor as additional information in addition to the contents of the test result (see FIG. 5 as appropriate), at a time of execution of the test printing described above.

Then, in a setting stage of the print job, the control unit 40 refers to or searches the above-described database stored in the storage unit 44, and determines whether or not the recording medium P and ink to be used in the print job have been used in test printing executed in the past.

At this time, in a case where the recording medium P and the ink to be used in the print job have not been used in test printing executed in the past, the control unit 40 determines that there is a possibility that an accurate irradiation condition of the first UV irradiation unit 25 cannot be calculated, and causes the operation display unit 34 to display a message indicating that test printing should be performed.

Whereas, in a case where the recording medium P and the ink to be used in the print job have been used in test printing executed in the past, the control unit 40 acquires a current ambient temperature and humidity of the image formation device 1 from the detection values of the temperature and humidity sensor.

Then, in a case where the current ambient temperature (or humidity) of the image formation device 1 exceeds a threshold value, for example, in a case where a difference with respect to a temperature at a time of execution of the test printing performed in the past exceeds 10 degrees, the control unit 40 determines that there is a possibility that an accurate irradiation condition of the first UV irradiation unit 25 cannot be calculated from the print result of the past test printing, and causes the operation display unit 34 to display a message indicating that test printing should be performed again.

By providing a configuration for performing management and notification such as warning to the user as described above, it is possible to set more accurate and optimal irradiation conditions of the first UV irradiation unit 25 in response to changes in various image forming conditions.

In the embodiment described above, the case of using the UV curable ink and irradiating UV light as the pre-fixing unit has been described, but the configuration is not limited thereto. As another example, a configuration may be adopted in which ink that is cured by electron ray irradiation may be used, and the electron ray may be irradiated as the pre-fixing unit.

In addition, the above-described embodiment is merely an example of implementation in carrying out the present invention, and the technical scope of the present invention should not be construed in a limited manner by these. That is, the present invention can be implemented in various forms without departing from the scope or main features of the present invention.

REFERENCE SIGNS LIST

1 image formation device
2 conveyance unit
10 head unit (image forming unit)
21 feeding roller
22, 24 driven roller
23 winding roller
25 (25*w*, 25*k*, 25*c*, 25*m*) first UV irradiation unit (pre-fixing unit)
28 second UV irradiation unit (fixing unit)
34 operation display unit
40 control unit (setting unit, print management unit)
51 conveyance driving unit 51
102 inkjet head (image forming unit)
200 external device
P recording medium

The invention claimed is:

1. An image formation device comprising:

an image former that ejects ink of one or more colors onto a recording medium to form an image;

a fixer including a pre-fixer that irradiates the formed image with an energy ray to semi-cure the image, the fixer fixing the image on the recording medium;

a storage that stores, for each of manufacturers of ink and for each of manufactures of recording medium, print results of test printing in past time in accordance with a type of the ink and a type of the recording medium; and a hardware processor that receives an instruction including ink manufacturer information and recording medium manufacturer information from a user, the ink manufacturer information indicating a manufacturer of ink to be used in a print job, the recording medium manufacturer information indicating a manufacturer of recording medium to be used in the print job; and sets an irradiation condition of the fixer in the print job based on the instruction and a corresponding one of print results of the test printing executed in past time, at a time of execution of the print job.

2. The image formation device according to claim 1, wherein the hardware processor sets an irradiation energy amount of the energy ray irradiated by the pre-fixer at a time of execution of the print job, as the irradiation condition.

3. The image formation device according to claim 2, wherein the hardware processor sets the irradiation condition of the pre-fixer, for each of the ink ejected by the image former.

4. The image formation device according to claim 2, wherein the hardware processor obtains and sets a value of the irradiation condition from a value in which a print result of the test printing is inputted.

5. The image formation device according to claim 2, wherein the hardware processor prints a predetermined inspection chart in the test printing, and sets the irradiation condition based on the print result.

6. The image formation device according to claim 2, wherein the hardware processor sets the irradiation condition of the fixer based on the print result inputted by a user.

7. The image formation device according to claim 2, wherein the hardware processor sets the irradiation condition of the fixer based on a reading result of an image read by an image reader in the test printing.

8. The image formation device according to claim 2, wherein the hardware processor sets an irradiation condition of the fixer to satisfy designated image characteristics, at a time of execution of the print job.

9. The image formation device according to claim 2, wherein the hardware processor performs a process of prompting execution of the test printing in accordance with an image forming condition.

10. The image formation device according to claim 1, wherein the hardware processor sets the irradiation condition of the pre-fixer, for each of the ink ejected by the image former.

11. The image formation device according to claim 3, wherein the hardware processor obtains and sets a value of the irradiation condition from a value in which a print result of the test printing is inputted.

12. The image formation device according to claim 1, wherein the hardware processor obtains and sets a value of the irradiation condition from a value in which a print result of the test printing is inputted.

13. The image formation device according to claim 1, wherein the hardware processor prints a predetermined inspection chart in the test printing, and sets the irradiation condition based on the print result.

14. The image formation device according to claim 13, wherein the inspection chart is a chart in which a density of an image formed with a single color or a mixed color of the ink ejected from the image former is gradually changed.

15. The image formation device according to claim 1, wherein the hardware processor sets the irradiation condition of the fixer based on the print result inputted by a user.

16. The image formation device according to claim 1, wherein the hardware processor sets the irradiation condition of the fixer based on a reading result of an image read by an image reader in the test printing.

17. The image formation device according to claim 1, wherein the hardware processor sets the irradiation condition of the fixer to satisfy designated image characteristics, at a time of execution of the print job.

18. The image formation device according to claim 1, wherein the hardware processor performs a process of prompting execution of the test printing in accordance with an image forming condition.

19. The image formation device according to claim 1, wherein in a case where the recording medium and the ink to be used in the print job have not been used in the test printing executed in past time, the hardware processor causes an operation display unit to display a message indicating that test printing should be performed.

20. The image formation device according to claim 1, further comprising:

a temperature and humidity sensor that detects temperature and humidity, wherein the storage further stores detection values of the temperature and humidity in addition to the print results of test printing in past time, and the hardware processor receives a detection value of current temperature and humidity from the temperature and humidity sensor, and in a case where the current temperature or humidity exceeds a threshold value, causes an operation display unit to display a message indicating that test printing should be performed.

* * * * *